United States Patent Office 3,362,860
Patented Jan. 9, 1968

3,362,860
PROPELLANT COMPOSITION CONTAINING ORGANIC BORON POLYMERS
Gaetano F. D'Alelio, South Bend, Ind., assignor, by direct and mesne assignments, to Dal Mon Research Co., Cleveland, Ohio, a corporation of Delaware
No Drawing. Original application Sept. 17, 1958, Ser. No. 761,470, now Patent No. 3,234,288, dated Feb. 8, 1966. Divided and this application July 21, 1965, Ser. No. 473,827
17 Claims. (Cl. 149—19)

This application is a divisional application of applicant's copending application Ser. No. 761,470, filed Sept. 17, 1958, now Patent No. 3,234,288.

This invention relates to polymers containing boron.

Because of the high energy content of such compounds, boron compounds having boron to carbon bonds, such as alkyl boranes, have been suggested as fuel compositions. However, because of their tendency to ignite spontaneously upon exposure to air, and the highly reactive nature of these compounds, the use of alkyl boranes involves considerable danger and necessitates various precautionary steps. Moreover, since they are liquids, their use as propellant fuels for rockets, missiles, and related devices, has the drawbacks common to liquid fuels in that complicated containers and pumping devices are required, and the sloshing effect of the liquids in their containers causes shifting of weight which adversely affects directional control.

In accordance with the present invention, polymeric borane compounds have been discovered which have more easily controlled flammability and reactivity while still retaining high energy content. Such polymeric materials can be made in the solid state and thereby have the inherent advantages of solid fuels used for propelling purposes.

The polymeric compositions of this invention are prepared from boron hydrides, or the boranes, including the various polyboranes, such as diborane, triborane, tetraborane, pentaborane, hexaborane, decaborane, etc., and the mono- and poly-substituted boranes in which the substituents are hydrocarbon groups (including those having substituents thereon which are nonreactive to boranes), by reaction with hydrocarbon compounds (including those having substituents thereon which are nonreactive to boranes), having at least one acetylenic or allenic group therein.

Such compositions can be made in liquid or solid form, and can be converted to infusible forms. These polymeric compositions are useful as high energy fuels, either as a supplement, or as the main component, and are particularly useful in the solid form for such purposes. Particularly useful infusible solid fuels can also be made by incorporating a solid or liquid oxidizing agent into the polymeric compositions of this invention while they are in a liquid or thermoplastic state, and then converting the polymer to a crosslinked, infusible condition.

Typical boranes and unsubstituted boranes that can be used in the practice of this invention include, but are not limited to, the following: diborane, triborane, tetraborane, pentaborane, hexaborane, decaborane, trimethyl borane, triethyl borane, tripropyl borane, tributyl borane, triamyl borane, trihexyl borane, tri-octyl borane, tri-decyl borane, tri-tetradecyl borane, tri-cyclohexyl borane, triphenyl borane, triphenethyl borane, monomethyl diborane, symmetrical dimethyl diborane, unsymmetrical dimethyl diborane, trimethyl diborane, tetramethyl diborane, monoethyl diborane, symmetrical diethyl diborane, unsymmetrical diethyl diborane, triethyl diborane, tetraethyl diborane, monopropyl diborane, symmetrical dipropyl diborane, unsymmetrical dipropyl diborane, tripropyl diborane, tetrapropyl diborane, trimethyl triborane, tetramethyl triborane, hexamethyl triborane, tetraethyl tetraborane, hexaethyl tetraborane, etc.

Borane or borine ($BH_3$) is unstable as such and dimerizes to diborane which reacts as two molecules of borane. Therefore, diborane is generally the reagent actually used. However, it is convenient to consider this as a reaction of borane, as indicated in various reactions described herein. Whvere reactions of mono-substituted boranes are indicated, it is generally also possible to use polyboranes having one such substituent on each boron atom, such as symmetrical dimethyl diborane, etc. Likewise, in reactions calling for disubstituted boranes, it is also possible to use polyboranes having two such substituents on each boron atom, such as tetramethyl diborane, etc.

Because of the tendency of various mono- and di-substituted boranes, and of various substituted diboranes and other polyboranes to disproportionate and form tri-substituted boranes and diborane, it is generally desirable to keep such reagents at low temperatures until they are to be used. In some cases, where particularly active reagents are being used, it may be desirable to mix the reactants at low temperature and allow the temperature to rise gradually. In certain cases, it is desirable to use a diluent or solvent to facilitate control of temperature and concentration. Generally, the reaction can be controlled by adding the borane gradually while maintaining the other reactant at the desired reaction temperature. It is generally advantageous to add the borane to the polyalkenyl compound either as such, or in solution.

The polymeric products of this invention range from viscous oils to solid thermoplastic or thermoset resins. Depending upon the particular starting materials, modifiers, and polymerization conditions, the polymers range in molecular weight from about 200 to 100,000 and higher.

It is not intended that the invention be limited to any particular theory, or to any particular formula. It is believed, however, that polymers obtained by the practice of this invention can be represented by the formula:

wherein X is R or Y, and Y is a polyvalent radical derived from acetylenic and allenic compounds, and having as many valencies as there are boron atoms attached thereto. When derived from a monoacetylenic compound having no ethylenic groups therein, Y is a divalent radical. When derived from a monoacetylenic compound, which also has an ethylenic group therein, or from compounds having a plurality of acetylenic groups therein, or from compounds having both an acetylenic and an allenic group therein, Y can have more than two valencies.

While it is believed that each boron atom becomes attached to one of the carbon atoms of the acetylenic or allenic group, it is also possible that the boron migrates during or after the reaction between the borane compound and the acetylenic or allenic compound, and becomes attached to any other carbon atom of the acetylenic or allenic compound that gives a more stable derivative. Thus, when the acetylenic compound is represented as $RC \equiv CR$, wherein R is hydrogen or a hydrocarbon group, the boron can actually be attached to one of the carbon atoms of the acetylenic group, or to the R group. For that reason, Y is represented as a polyvalent radical having the formula $R_2C_2H_2$ without pinpointing the carbon atom to which the boron is actually attached.

Accordingly, the polymeric products of this invention derived from acetylenic compounds can generally be represented by the formula:

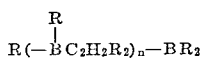

or

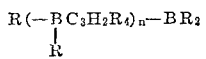

When the boron becomes attached and does not migrate from the acetylenic group, the polymeric product is believed to be represented by the following formula:

In the above formulas, R represents hydrogen or a hydrocarbon group; $n$ is an integer greater than 1, preferably greater than 4; the hydrocarbon nucleus of R can have attached thereto substituents which are nonreactive toward the borane compound being used. However, additional acetylenic groups can also be attached to one or more R's, and one ethylenic group can be attached to or included in one of the R's.

Likewise, the polymeric products derived from allenic compounds are believed to be represented by the corresponding formulas:

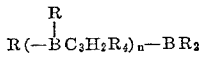

and

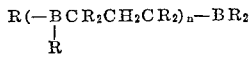

respectively.

In accordance with the above discussion, typical Y groups include, but are not restricted to, the following:

$$—CH_2CH_2—; \quad —CH_2CH_2CH_2—$$

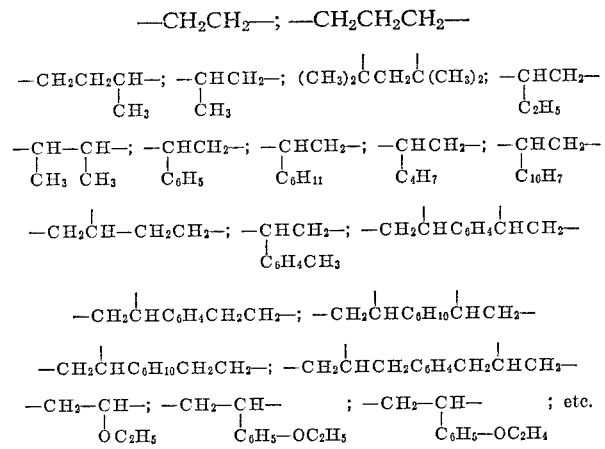

It is also believed that when infusible polymers are obtained by the practice of this invention, the crosslinkages between linear polymer chains, such as represented above, can generally be represented by replacing an R group from a boron atom in two different polymer molecules and substituting for two such R groups, the polyvalent radical Y. Moreover, if the acetylenic compound has a second acetylene group, or an allenic group, or an ethylene group therein, crosslinking can be effected by attachment of a boron atom to such second acetylenic group, or said allenic group, or said ethylenic group, and in turn is connected directly or indirectly to a second polymer molecule.

When the borane has no more than one hydrocarbon group attached to each boron atom, such as borane, diborane, triborane, methyl borane, ethyl borane, propyl borane, symmetrical dimethyl diborane, symmetrical diethyl diborane, 1,2,3-trimethyl triborane, etc., and an acetylenic or allenic compound is used, it is believed that polymerization proceeds linearly, at least initially, as follows:

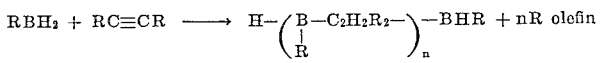

or

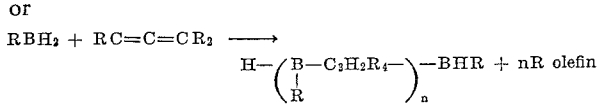

When a borane is used has two ore more hydrocarbon groups on each boron atom or a linear polymer, such as above, is used in which the R on the boron is a hydrocarbon group, the hydrocarbon groups can be displaced by the acetylenic or allenic compound, and the R groups liberated as the corresponding olefin. For example, when the three R's on each boron atom are hydrocarbon groups, the polymer is believed to proceed linearly, at least initially, as follows:

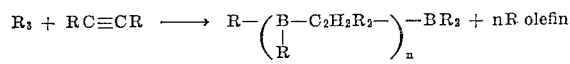

or

When crosslinking is effected through the boron atoms, it is believed that the crosslinked portion of the polymer can be represented as:

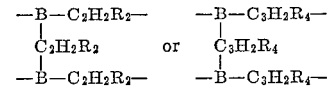

When crosslinking is effected through an additional unsaturated group in the acetylenic or allenic compound, it is believed that the crosslinked portion of the polymer can be represented as:

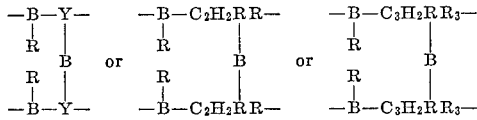

Various modifications of polymeric materials can be made according to the practice of this invention, by adjusting the proportions of reactants and the conditions under which the materials are made to react. For example, control of the proportions of reactants enables control over the amount of crosslinking and the amount of polymer formation before crosslinking is effected. Thus, by increasing the proportion of the acetylenic or allenic compound, a higher degree of conversion to polymer can be effected before crosslinking begins. Likewise, the higher the ratio of boron compound to acetylenic or allenic compound, the lower is the degree of conversion before crosslinking takes place. The selectivity, type of reaction, and product, can be controlled somewhat by selecting appropriate boron compounds, concentrations thereof, the acetylenic or allenic compound, and also by the use of certain amounts of monoalkenyl compounds. For example, since the hydrogen in borane compounds is more easily replaced than alkyl groups, it is possible thereby to control somewhat the type and extent of reaction.

On the basis that functionality of the borane is 3 and that of an acetylenic or allenic compound is equivalent to 2, since each acetylenic or allenic group acts as a dialkylating agent, a rough estimate of the extent of reaction can be calculated from the functionality equation $P=2/F$ where P equals the extent of reaction and F is the functionality of the system. Approximate values derived from such calculations are shown in the following table:

| Boron compound (moles) | Acetylenic or or allenic Compound (moles) | Appropimate extent of reaction before crosslinking (percent) |
| --- | --- | --- |
| 1 | 4 | 91 |
| 1 | 3 | 89 |
| 1 | 2 | 86 |
| 1 | 1 | 80 |
| 3 | 2 | 77 |
| 2 | 1 | 75 |
| 3 | 1 | 73 |
| 4 | 1 | 72 |

As indicated by these calculations, the higher the mole ratio of the boron compound to the acetylenic or allenic compound, the sooner the crosslinking is likely to occur as the reaction proceeds. When a mole of a monoacetylenic compound having an ethylenic group also included therein, such as vinylacetylene, is reacted with a mole of boron compound, $BR_3$, the value for P approaches 67%, whereas when a diacetylenic compound, such as phenylene diacetylene, is used, the gellation value P approximates 57%.

It is generally desirable to use proportions of the reactants in accordance with the properties desired in the polymer products. For example, if low molecular weight products are desired, molar proportions of the acetylenic or allenic compound in excess of the theoretical proportions favors this. Where high proportions of the metal are desired, this is favored by use of excess metal compound, and also by the use of compounds having a greater number of unsaturated groups therein. High proportions of metal in the product are also favored by the use of low molecular weight acetylenic and allenic compounds.

When it is desired to prepare a thermoplastic resin according to the practice of this invention, either for use as such, or for mixture with other materials, or intermediate treatment prior to conversion to an infusible resin, it is advantageous to use a borane having one hydrocarbon group per boron atom. However, thermoplastic resins can also be prepared by controlling the reaction conditions when unsubstituted boranes are used, or when boranes are used having more than one hydrocarbon substituent per boron atom.

The preparation of thermoplastic resins can also be facilitated by the use of monoalkenyl compounds which will replace the hydrogen on borane and thereby retard crosslinking until desired, at which time higher temperatures can be used to replace such alkyl groups with the acetylenic or allenic compound. Thus, it may be seen that when one mole of a borane, e.g. triethyl borane, is reacted with one mole of an acetylenic compound, e.g. phenylacetylene, and one mole of a monoalkenyl compound, which can be a hydrocarbon or ether compound, a higher molecular weight thermoplastic boron-containing polymer is obtainable, as illustrated by the following equation, which shows the repeating units in the polymer, e.g.:

$B(C_2H_5)_3 + CH \equiv CHC_6H_5 + CH_2 = CHC_6H_5 \longrightarrow$

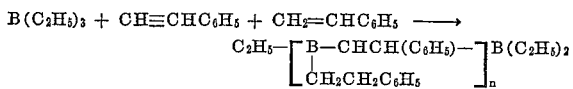

By further heating and by alkylation exchange, this polymer can be converted to a crosslinked polymer, for example by exchange of additional phenylacetylene for styryl groups, or by compounding or dispersing the polymer in excess phenylacetylene, and having the liberated styrene copolymerize with ethylenic groups derived from the phenylacetylene. Allenic compounds can be reacted similarly in place of the phenyl acetylene to give corresponding polymer structures.

By the practice of this invention, a wide range of boron-modified polymers can be made by varying the ratio of the boron compound to the acetylenic or allenic compound and thereafter effecting addition polymerization with monoalkenyl compounds, particularly those containing active polymerizable vinyl or vinylidene groups, such as styrene, vinylphenylether, etc. Also, before gellation, an oxidizing agent, particularly a solid oxidizing agent of the type indicated hereinafter, can be added to produce fuel compositions of self-sustaining combustion properties. Alternately, if the borane compound containing alkyl groups derived from active polymerizable olefins, such as styrene, is treated with an acetylenic or allenic compound containing active polymerizable groups, the released olefins can copolymerize with the resulting reaction product.

When it is desired to control the molecular weight of a linear polymer, or to put terminal hydrocarbon groups on a polymer chain, this can be accomplished by using a mono-olefin, such as ethylene, propylene, styrene, or an ether compound having only one ethylene group therein, together with the acetylenic or allenic compound as indicated above. This can also be done by using a trisubstituted borane, alone or together with an unsubstituted or mono-substituted borane.

In the addition of boranes to an acetylenic or allenic group, it is advantageous to catalyze the reaction by the use of an organic ether. Diethyl ether, diisopropyl ether, tetrahydrofurane, diglyme, etc., are particularly useful for such purposes, as well as the borane derivatives which contain ether groups therein, including, but not limited to: mono-(beta methoxy-ethyl)-borane, bis-(beta methoxy-ethyl)-borane, tris-(beta methoxy-ethyl)-borane, mono-(beta ethoxy-ethyl)-borane, bis-(beta ethoxy-ethyl)-borane, tris-(beta ethoxy-ethyl)-borane, mono-(beta-methoxy-ethyl)dimethyl-borane, bis-(beta-ethoxy-ethyl) ethyl-borane, beta-(ethoxy-phenyl)-ethyl borane, beta-(ethoxy-cyclohexyl)-ethyl borane, etc.

Such boron ether derivatives can be prepared simply by the addition of boranes to ethylenically unsaturated ethers, such as vinyl methyl ether, vinyl ethyl ether, vinyl butyl ether, vinyl propyl ether, vinyl amyl ether, vinyl cyclohexyl, vinyl phenyl, vinyl tolyl, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc. Such unsaturated ethers can also be added directly to the reaction mixture to serve as modifiers as well as catalysts.

The temperature conditions for the promotion of polymer formation, in accordance with the practice of this invention, vary in accordance with the reactivity of the reagents being used. When a boron hydride is being reacted with an acetylenic or allenic compound, a temperature in the range of 70°–80° C. is generally suitable. When boron hydride compounds containing both hydrogen and hydrocarbon groups are used, the reaction can be controlled mainly to displace the hydrogen by keeping the temperature below 100° C. When hydrocarbon groups are to be displaced from a boron hydride compound, a temperature of about 100°–120° C. is preferred. Temperatures lower than those indicated above can also be used, but longer reaction times are then required. Depending upon the decomposition temperature of the particular reagent and the polymeric product, it is generally advantageous not to exceed a temperature of about 140° C. When a mixture of boron hydride and a boron hydride compound containing hydrocarbon groups is being used, it is generally desirable to maintain the appropriate temperature until most of the hydrogen has been displaced and then to raise the temperature to that more suitable for displacement of the hydrocarbon group. In some cases, the temperature control can be facilitated by the use of an inert solvent, such as heptane, octane, benzene, toluene, xylene, etc., whose boiling point is close to the desired temperature.

The time required for polymer formation varies in accordance with the reactivity of the unsaturated groups in the acetylenic or allenic compound, the type of group to be displaced in the boron hydride compound, the temperature being used, and various other factors which favor the reaction, such as the removal of the byproduct olefin, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with terminal acetylenic or allenic groups. Acetylenic and allenic compounds having hydrocarbon groups attached to both ends of the unsaturated group are less reactive than those having terminal unsaturation, and require longer reaction time even at the more favorable temperature conditions. The time will also vary in accordance with the degree of polymerization required. While the more active reagents can give polymers in even less time, many of the polymeric products of this invention can be produced at moderate temperatures in a matter of 12 to 48 hours. In some cases, such as with the less reactive type of ethylenic groups, or when low temperatures, for example, 50° C. or lower, are used, longer reaction periods are often desirable. In such cases, the reaction is continued until a solid product is obtained.

When a high proportion of metal is desired in the ultimate product, it is preferred that the acetylenic or allenic compound be of relatively low molecular weight, generally not over 200 or 300.

Typical acetylenic and allenic compounds that can be used in the practice of this invention include, but are not limited to the following: acetylene, methylacetylene, ethyl acetylene, propyl acetylene, amyl acetylene, vinyl acetylene, diacetylene (butediyne), dipropargyl (hexadiyne-1,5), hexadiyne-2,4, allene, butadiene-1,2, 4-methyl-pentadiene-1,2, tetramethyl allene, phenyl acetylene, phenylene diacetylene, para-vinyl phenyl acetylene, naphthyl acetylene, cyclohexyl acetylene, cyclopentyl acetylene, naphthylene diacetylene, cyclohexylene diacetylene, dipropargyl benzene, dipropargyl naphthalene, dipropargyl cyclohexene, p-propargyl styrene, p-ethoxy-phenyl acetylene, p-vinyloxy-phenyl acetylene, propargyl phenyl ether, propargyl ethyl ether, propargyl vinyl ether, p-vinyl-phenyl propargyl ether, etc.

In cases where the reactants are gaseous, the reaction can advantageously be carried out by mixing the reactants at room temperature then passing into a solvent maintained at the desired reaction temperature. The solvent thereafter can be removed, for example, by evaporation etc., and, if desired, the product can be heated to increase its viscosity, or to convert it to infusibility.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

*Example I*

A mixture of 18 parts of tri-secondary-butyl borane, 1 part dioxane, and 50 parts of heptane is heated in an atmosphere of nitrogen at 50° C. Pure acetylene is bubbled into the solution at such a rate that the temperature does not rise above 55° C. When approximately 3 grams of acetylene has been absorbed, the acetylene supply is shut off and heating continued for an additional two hours. Then the temperature is raised gradually to distill off the heptane, following which the temperature is taken to 100° C. for a period of thirty hours. The product is washed with heptane to extract traces of unconverted tributyl borane. The washed product is stable in air in contrast to ordinary organo-boranes, which oxidize and burn in air. The resultant product is ground with an equal weight of ammonium perchlorate. The resultant mixture, when ignited and tested according to known tests for propellant thrust, shows excellent thrust properties.

*Example II*

The procedure of Example I is repeated, using 10 parts of triethyl borane in place of the tri-butyl borane, and 4.5 parts of methyl acetylene in place of the acetylene. In three different tests, 4 parts of the resultant polymer are ground individually with 6 parts of ammonium perchlorate, lithium perchlorate, and potassium perchlorate, respectively. In each case, the mixture when ignited burns very rapidly with an intense white flame and, upon testing for thrust properties, shows excellent thrust.

*Example III*

The procedure of Example II is repeated, except that allene is used in place of the methyl acetylene. Similar results are obtained.

The same procedure used with an equivalent weight of propyl acetylene also gives similar results.

*Example IV*

The following procedure is repeated 8 times, using in each case 18.2 parts of tri-isobutyl-borane, and with each experiment a progressively smaller amount of phenyl acetylene, as follows: 41, 30, 20, 10, 8, 5, 3, and 2 parts, respectively. In each case, the borane and the phenyl acetylene mixture is heated under an atmosphere of nitrogen at 50° C. until the reaction mixture forms a solid cake and no more butene is released from the reaction. The product is washed with heptane to extract traces of unconverted tributyl borane. The washed product is ground with an equal weight of ammonium perchlorate. The resultant mixtures, when ignited and tested according to known tests for propellant thrust, show excellent thrust properties.

*Example V*

The procedure of Example I is repeated, using 14 parts of tripropyl borane, and 4.5 parts of vinyl acetylene. The product shows similar burning and thrust properties.

*Example VI*

To a solution of 30 parts of tri-isobutyl-borane in 100 parts of heptane, covered by a blanket of nitrogen, is added 13 parts of phenylene diacetylene. The resultant mixture is heated under an atmosphere of nitrogen and the temperature is raised gradually to remove the heptane by distillation. Then the temperature is maintained in the range of 100°–120° C. for 48 hours. The resultant solid product is washed with heptane, and then ground with an equal weight of ammonium perchlorate. The resultant mixture, when ignited and tested, shows excellent burning and thrust properties.

The above procedure is repeated, using in one case cyclohexylene diacetylene, and in another case naphthylene diacetylene in amounts equivalent to and in place of the phenylene diacetylene used in the above procedure. In each case results are obtained similar to those indicated above.

*Example VII*

The procedure of Example VI is repeated, using 50 parts of tri-styryl-borane in place of the tri-isobutyl-borane. The resultant solid product, when ground with an equal weight of ammonium perchlorate, shows excellent ignition and thrust properties.

Example VIII

The following procedure is repeated a number of times, using in each case a different mixture selected from those indicated in the table below. The number appearing in the table before a particular compound indicates the number of parts by weight of that compound used. In each case the acetylenic or allenic compound, together with any solvent or modifier, is maintained under an atmosphere of nitrogen at a temperature of 50°–55° C. In the case of vinyl acetylene, it is fed into the heptane solvent at such a rate that it is present in molecular excess to the amount of diborane present. Any acetylenic or allenic compound lost from the system through volatilization is caught in a low temperature trap and returned to the system. Diborane is fed into the system at such a rate that no more than a 5° rise in temperature occurs. When the temperature rises above 60° C., the diborane supply is cut off or reduced until the temperature has subsided to the desired range. After 14 parts of diborane have been absorbed by the reaction mass, the diborane supply is cut off and the heating is continued for a period of two hours, after which the temperature is gradually raised to remove any solvent present and is maintained at 90°–95° C. for 10 hours. In each case, the resultant solid product shows excellent burning and thrust properties.

TABLE

| Acetylenic or Allenic Compound | Modifier | Solvent or Catalyst |
|---|---|---|
| 110 Phenyl acetylene | | |
| 90 Phenyl acetylene | 5 Diallyl ether | |
| 120 Cyclohexyl acetylene | | 2 Diethyl ether. |
| 100 Amyl acetylene | | {10 Tetrahydrofurane. <br> 190 Heptane. |
| 30 Vinyl acetylene | 5 Vinyl ethyl ether | 100 Heptane. |
| 75 Phenylene diacetylene | | Do. |
| 80 Hexadiene-1,2 | | 5 B(BC$_2$CH$_2$OC$_2$H$_5$)$_3$. |
| 120 p-Vinyloxy-phenyl acetylene | | 100 Cyclohexane. |

Example IX

A mixture of 10 parts of triethyl borane, 10 parts of phenylacetylene, and 0.1 part of diethyl ether is heated under a nitrogen atmosphere at 50° C. for 6 hours. The mixture is then cooled to room temperature and 10 parts of styrene, and 36 parts of finely ground ammonium perchlorate are added. The mixture is milled to uniformity and then press-cast in the form of a rod and heated at 60°–70° C. for 12 hours. A solid, infusible product is obtained which shows excellent thrust properties.

Example X

A mixture of 33 parts of tri-styryl borane, 20 parts of amylacetylene, and 0.2 part of para-allyloxy-phenylacetylene is heated at 70° C. in a sealed container for a period of 48 hours. The resultant solid product shows excellent burning and thrust properties.

The above procedure is repeated using 40 parts of phenylacetylene in place of the amylacetylene, and also 80 parts of ammonium nitrate, to produce a solid propellant fuel of excellent thrust.

Example XI

A mixture of 13 parts of triallyl-borane, 7.5 parts of triethyl aluminum, and 0.1 part of diethyl ether is heated under an atmosphere of methane for 15 hours at 70° C. An insoluble, infusible product is obtained. This polymer is believed to have, at least in part, repeating units of the following structure:

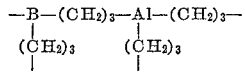

By using equivalent amounts of diethyl magnesium and diethyl beryllium, respectively, in place of the tri-ethyl aluminum, and in each case repeating the preceding procedure, two solid products are obtained which are believed to have, at least in part, repeating units of the following structures:

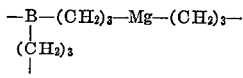

and

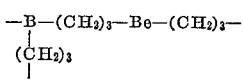

respectively.

Example XII

Ten parts of the polymer of Example I is mixed uniformly with 40 parts of finely divided ammonium perchlorate in a solution of 9 parts of styrene, one part of a 50/50 commercial divinyl benzene-ethyl styrene mixture, and 0.1 part of benzoyl peroxide. The mixture is cast and maintained at 70° C. for 12 hours. An insoluble, infusible polymer product is obtained, which shows excellent thrust properties.

Example XIII

A mixture of 27 parts of symmetrical dimethyl diborane, 0.5 part diethyl ether and 100 parts of heptane is prepared and maintained under an atmosphere of nitrogen at −10° C. Pure acetylene is bubbled into the solution at such a rate that the temperature is raised only very slowly to no higher than 50°–55° C. Volatile reactants escaping from the system are caught in a cold trap and returned to the reaction mixture. When approximately 3 grams of acetylene has been absorbed, the acetylene supply is shut off and the temperature is maintained at 50°–55° C. for an additional 5 hours. Then, the temperature is raised gradually to distill off the heptane, following which the temperature is taken to 80° C. for a period of 15 hours. The solid polymer product, when tested as in Example I, shows excellent burning and thrust properties.

The above procedure is repeated a number of times, with similar results, using in place of the symmetrical dimethyl diborane, an equivalent weight of:

symmetrical diethyl diborane
tetramethyl diborane
tetrapropyl diborane
pentaborane
decaborane, respectively.

The polymerization described herein can be suspended at an early stage to give viscous oils or low melting solid polymers, which can be stored as such and the reaction completed at a subsequent time. In fact, the reaction can be suspended when the product comprises substantially a monomeric product, such as, for example, that derived from a borane and allene, namely: $R_2B$—$CH_2CH$=$CH_2$, $RB(CH_2CH$=$CH_2)_2$, or $B(CH_2CH$=$CH_2)_3$, and the polymerization completed later with the addition of additional boranes, or other reagents, modifiers, heat, etc.

As modifiers in the preparation of polymers, according to the practice of this invention, various mono- and polyalkenyl types of aluminum, beryllium, and magnesium compounds can be added before or during the polymerization. By substitution of such alkenyl compounds for remaining hydrogen or saturated hydrocarbon groups on the boron hydride compounds, or by reaction with compounds which have already partially reacted with boron, both boron and aluminum, beryllium, or magnesium can be incorporated in polymeric compositions.

Such modifiers include those formed by the addition of aluminum, beryllium, and magnesium hydrides and their hydrocarbon-substituted and unsaturated ether derivatives, such as methyl dibutenyl aluminum, tributenyl aluminum, methyl diallyl aluminum, di(vinyloxyethyl) beryllium, diallyl beryllium, dibutenyl beryllium, ethyl butenyl magnesium, diallyl magnesium, dibutenyl magnesium, bis-(p-vinyl-phenethyl)-magnesium, methyl bis-(p-vinyl-phenethyl)-aluminum, etc.

Various other modifiers can be added, either prior to the initiation of the addition reaction, at some intermediate stage, or after the reaction is completed. Such modifiers include various other resins, such as: polystyrene, polyethylene, polypropylene, polybutenes, paraffins, polyvinyl ethers, such as polymeric vinyl ethyl ether, polymeric vinyl butyl ether, etc. Certain other resins containing ester, amide, or other groups that may be reduced or reacted upon by the metal compounds can be added after the boron polymers are formed. However, if sufficient metal compound is added to compensate for that used in such side reactions, such resins can also be added before or during the reaction. Such resins include: polyesters, such as polyvinyl acetate, polyvinyl propionate, polyvinyl butyrate, polymethyl methacrylate, polymethyl acrylate, etc., polyvinyl acetal, polyvinyl butyral, etc., polyacrylonitrile, polyamides, such as nylon and polymeric caprolactam, etc.

Various other unsaturated compounds can also be added, either before initiation of the addition reaction, at an intermediate stage, or at the completion of the reaction, to modify the properties of the products. With regards to esters, etc., reactive with the metal hydrides or derivatives, the same comments apply as made above with respect to resins having ester groups, etc. Such unsaturated compounds include: polyunsaturated hydrocarbons, polyunsaturated esters, polyunsaturated ethers, polyunsaturated ether-esters, and various corresponding mono-unsaturated compounds.

Typical examples of such unsaturated compounds include, but are not restricted to, the following: 1,3-butadiene, isoprene, 2,3-dimethyl butadiene, pentadiene-1,3, hexadiene-2,4, octadiene-2,4, hexatriene-1,3,5, 2-phenyl-butadiene, 1,3-pentadiene, hexadiene-1,5, 2,4-dimethyl-pentadiene-1,4, vinyl cyclohexene, 1-phenyl-pentadiene-1,3, divinyl cyclohexane, diallyl, 1,6-heptadiene, 1,8-nonadiene, 2,8-decadiene, 2,9-dimethyl-2,8-decadiene, divinyl cyclopentane, devinyl methyl cyclohexane, dipentenyl cyclohexane, allyl cyclohexene, diallyl cyclohexene, divinyl cyclohexene, (beta-vinylalkyl)-furane, (beta-allyl-ethyl)-furane, diallyl cyclohexane, diallyl cyclopentane, dibutenyl cyclohexane, 1,7-diphenyl-heptadiene-1,6, 2,7-diphenyl-octadiene-1,7, divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyl diphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methyl naphthalene, vinyl allyl chlorodiphenyl, diallyl benzene, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-vinyl-ethyl)-benzene, bis-(alpha-vinyl-ethyl)-naphthalene, bis-(alpha-vinyl-ethyl)-diphenyl, vinyl(alpha-vinyl-ethyl)-benzene, vinyl(alpha - vinyl - ethyl) - naphthalene, vinyl (alpha-vinyl-ethyl)-diphenyl, dipropenyl benzene, p-propenyl styrene, para-propenyl isopropenyl-benzene, dicrotyl benzene, dicrotyl naphthalene, dicrotyl diphenyl, dicrotyl anisole, dicrotyl xylene, bis-(4-vinyl-n-butyl)-benzene, vis-(5-isopropenyl-n-hexyl)-benzene, bis-(5-isopropenyl-n-hexyl)-diphenyl, bis-(5-methyl-hepten-5-yl)-benzene, bis-(5-methyl-nonen-6-yl)-diphenyl, bis-(n-decen-5-yl)-toluene, dicyclopentenyl-naphthalene, di-cyclohexenyl-benzene, divinyl ether, diallyl ether, vinyl allyl ether, propenyl vinyl ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diallyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanic, divinyl octadecanedioate, vinyl 11-acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11-isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5-isopropenyloxy-caproate, vinyloxy-tetramethylene acrylate, allyloxy-hexamethylene methacrylate, allyloxy-octamethylene crotonate, isopropenyloxy-octamethylene acrylate, crotyloxy-hexamethylene methacrylate, ethyl diallyl naphthalene, propyl di· butenyl benzene, butyl dibutenyl benzene, ethylene, propylene, butene-1, butene-2, hexene-1, hexene-2, t-butyl-ethylene, 2,4,4-trimethyl-1-pentene, 2,4,4,4-trimethyl-pentene-2, cyclopentene, cyclohexene, styrene, 1,1-diphenyl ethylene, vinyl cyclohexane, alpha-methyl-styrene, vinyl naphthalene, beta-methyl styrene, allyl benzene, allylcyclohexane, decene-1, decene-2, decene-3, decene-4, decene-5, dodecene-1, dodecene-2, tetradecene-1, hexadecene-1, cyclopentene, vinyl methyl ether, vinyl ethyl ether, vinyl butyl ether, vinyl propyl ether, vinyl amyl ether, vinyl cyclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc.

For many purposes, such as fuel, it is desirable to have a high concentration of the metallo-organo polymeric units present in the compositions. In such cases, the modifiers are used in minor amounts. However, in certain cases, it may be desirable to use the metallo-organo polymeric compositions to modify or fortify the properties of other materials, in which case, the metallo-organo derivatives are used in minor amounts.

As indicated above, the metallo-organo polymers of this invention are particularly useful as solid fuels. They can be used as the main fuel component or can be added to various types of other fuels to fortify or supplement such fuels. For example, they can be used as additives to gasoline and other motor fuels, to kerosene and other materials used for turbojet engines and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion. After the desired amount of oxidizing agent has been incorporated into the polymeric composition, it can be converted to an infusible form by various means including the addition of the metallo-organo compounds or catalysts to catalyze further metallo addition to unsaturated groups, the application of moderate heating for similar addition, or effecting crosslinking through the unsaturated groups themselves by heat alone, or by the addition of peroxy, azo, or other free radical-generating catalysts, or by any other means of crosslinking. The organo-metallo polymers can also be in infusible form before mixture with the oxidizing agent, having the polymers in finely divided form for intimate mixture. In such cases, if desired, the powder mixture can be cast by the addition of adhesive or resin.

In addition to oxygen-containing materials, such as free oxygen, hydrogen peroxide, etc., sometimes used to support combustion of fuels, other "oxidizing" materials, such as fluorine, chlorine, etc., can also be used to generate energy from these fuels.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula Ar—Cl—$O_3$, such as perchloryl benzene, perchloryl toluene, etc., various perchlorates, nitrates, oxides, persulfates, and perborates of metals and ammonia, such as ammonium perchlorate, potassium perchlorate, sodium perchlorate, ammonium nitrate, potassium nitrate sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chlorate, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used. The type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen which is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use from about 5 percent to 95 percent, preferably about 20 percent to about 80 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in fluid state, or the intermediate from which it is to be prepared, can be poured into a container holding the solid oxidizing agent and thereby fill the void spaces. Then upon standing at room temperature, or at slightly raised temperatures, the polymer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to precool the material to be mixed, or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A solid propellant fuel composition comprising 5–95 percent by weight of an oxidizing agent selected from the class consisting of solid, inorganic oxidizing salts and compounds having the formula $ArClO_3$, wherein Ar is a mononuclear aromatic hydrocarbon radical, and 95–5 percent by weight of a polymer having in the polymer molecule thereof a plurality of repeating units having the formula

wherein X is a radical selected from the class consisting of R and Y, R is a radical selected from the class consisting of hydrogen and hydrocarbon radicals, equivalent to a molecular weight no greater than about 200, and Y is a polyvalent radical equivalent to a molecular weight no greater than about 300 and selected from the class consisting of $—C_2H_2R_2—$ and $—C_3H_2R_4—$.

2. A fuel composition of claim 1 in which said polymer has at least four of said repeating units in the polymer molecule.

3. A fuel composition of claim 1 in which said oxidizing agent is potassium perchlorate.

4. A fuel composition of claim 1 in which said oxidizing agent is ammonium perchlorate.

5. A fuel composition of claim 1 in which said oxidizing agent is perchloryl benzene.

6. A fuel composition of claim 1 in which said oxidizing agent is lithium perchlorate.

7. A fuel composition of claim 1 in which said oxidizing agent is sodium perchlorate.

8. A fuel composition of claim 1 in which said repeating units have the formula

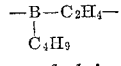

9. A fuel composition of claim 1 in which said repeating units have the formula

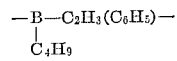

10. A fuel composition of claim 1 in which said repeating units have the formula

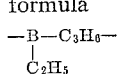

11. A fuel composition of claim 1 in which said repeating units have the formula

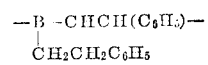

12. A fuel composition of claim 1 in which said repeating units have the formula $$-B-C_2H_3-$$
$$\phantom{-B-}|$$
$$\phantom{-B-}C_6H_4$$
$$\phantom{-B-}|$$
$$-B-C_2H_3-$$

13. A fuel composition of claim 1 in which said repeating units have the formula $$-B-C_2H_4-$$
$$\phantom{-B-}|$$
$$\phantom{-B-}CH_3$$

14. A fuel composition of claim 1 in which said oxidizer is potassium perchlorate and said polymer has a plurality of repeating units in the polymer molecules thereof having the formula $$-B-C_2H_4-$$
$$\phantom{-B-}|$$
$$\phantom{-B-}C_4H_9$$

15. A fuel composition of claim 1 in which said oxidizer is potassium perchlorate and said polymer has a plurality of repeating units in the polymer molecules thereof having the formula $$-B-C_2H_3(C_3H_5)-$$
$$\phantom{-B-}|$$
$$\phantom{-B-}C_4H_9$$

16. A fuel composition of claim 1 in which said oxidizer is potassium perchlorate and said polymer has a plurality of repeating units in the polymer molecules thereof having the formula $$-B-C_3H_6-$$
$$\phantom{-B-}|$$
$$\phantom{-B-}C_2H_5$$

17. A fuel composition of claim 1 in which said oxidizer is potassium perchlorate and said polymer has a plurality of repeating units in the polymer molecules thereof having the formula $$-B-CHCH(C_6H_5)-$$
$$\phantom{-B-}|$$
$$\phantom{-B-}CH_2CH_2C_6H_5$$

References Cited

UNITED STATES PATENTS

| | | | |
|---|---|---|---|
| 3,122,461 | 2/1964 | Lorenzo et al. | 149—19 X |
| 3,201,450 | 8/1965 | Cohen et al. | 149—19 X |

BENJAMIN R. PADGETT, *Primary Examiner.*